(12) United States Patent
Labat et al.

(10) Patent No.: US 11,614,870 B2
(45) Date of Patent: Mar. 28, 2023

(54) ZONED MEMORY DEVICE RECOVERY AFTER A KEY-VALUE STORE FAILURE

(71) Applicant: Micron Technology, Inc., Boise, ID (US)

(72) Inventors: Pierre Labat, Campbell, CA (US); Nabeel Meeramohideen Mohamed, Round Rock, TX (US); Steven Moyer, Round Rock, TX (US)

(73) Assignee: Micron Technology, Inc., Boise, ID (US)

( * ) Notice: Subject to any disclaimer, the term of this patent is extended or adjusted under 35 U.S.C. 154(b) by 20 days.

(21) Appl. No.: 17/314,657

(22) Filed: May 7, 2021

(65) Prior Publication Data

US 2022/0357859 A1 Nov. 10, 2022

(51) Int. Cl.
*G06F 3/06* (2006.01)

(52) U.S. Cl.
CPC .......... *G06F 3/0619* (2013.01); *G06F 3/0631* (2013.01); *G06F 3/0632* (2013.01); *G06F 3/0644* (2013.01); *G06F 3/0679* (2013.01)

(58) Field of Classification Search
CPC ..................................................... G06F 3/0632
See application file for complete search history.

(56) References Cited

U.S. PATENT DOCUMENTS

| | | | |
|---|---|---|---|
| 10,706,106 B2 | 7/2020 | Boles et al. | |
| 2013/0054869 A1* | 2/2013 | Tolia | G06F 16/00 711/E12.007 |
| 2019/0243906 A1* | 8/2019 | Bisson | G06F 16/13 |
| 2021/0019083 A1* | 1/2021 | Guo | G06F 11/1076 |

* cited by examiner

*Primary Examiner* — Edward J Dudek, Jr.
(74) *Attorney, Agent, or Firm* — Lowenstein Sandler LLP

(57) ABSTRACT

A system includes a zoned memory device allocating a zone storing a block belonging to a key-value set, and a processing device, operatively coupled with the zoned memory device, to perform operations including obtaining zone status information associated with the zone, identifying that the zone is a non-filled zone in view of the zone status information, and recovering the non-filled zone to obtain a recovered zone.

18 Claims, 6 Drawing Sheets

ZONED MEMORY DEVICE RECOVERY AFTER A KEY-VALUE STORE FAILURE

TECHNICAL FIELD

Embodiments of the disclosure relate generally to memory sub-systems, and more specifically, relate to zoned memory device recovery after a key-value store failure.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
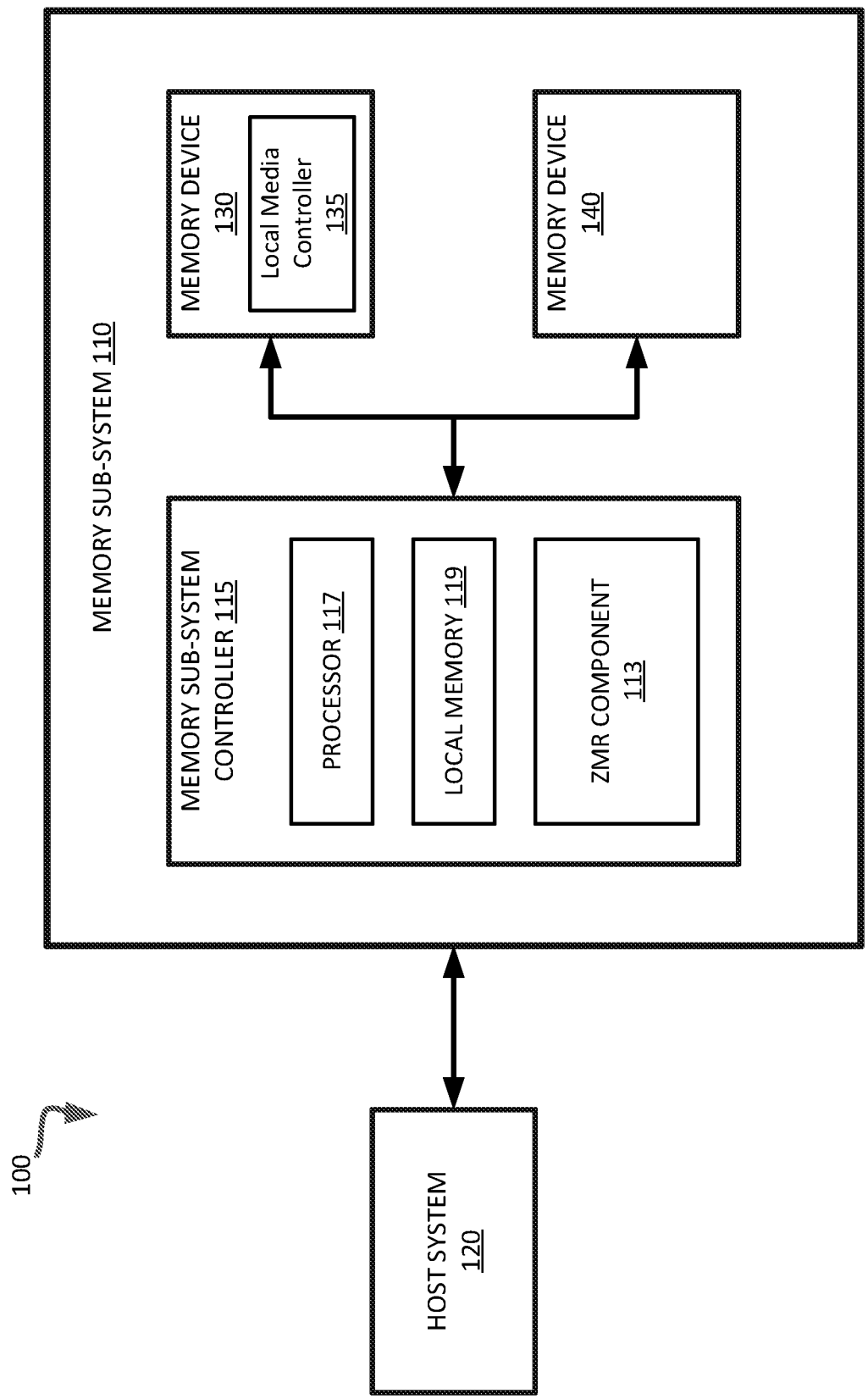
FIG. 1 illustrates an example computing system that includes a memory sub-system in accordance with some embodiments of the present disclosure.

Aspects of the present disclosure are directed to zoned memory device recovery after a key-value store (KVS) failure (e.g., power failure, device crash, KVS crash). A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A KVS data structure can accept a key-value pair and respond to queries for the key. A KVS data structure can include structures such as dictionaries (e.g., maps, hash maps, etc.) in which the key is stored in association with the respective value. More specifically, the KVS data structure can include a tree data structure referred to as a KVS tree. A KVS tree includes nodes with connections between parent nodes and child nodes based on a predetermined derivation of a key rather than the content of the tree. The predetermined derivation of a key is an entity derived from the key. In some embodiments, the predetermined derivation is a hash of the key.

The nodes can each include a temporally ordered sequence of immutable key-value sets containing key-value pairs in a key-sorted structure. Key entries of a key-value set can be stored in a set of key-blocks including a primary key-block and zero or more extension key-blocks. Value entries of the key-value set can be stored in a set of value-blocks. Members of the set of key-blocks and the set of value-blocks correspond to media blocks for a storage medium. Key-blocks and value-blocks can collectively be referred to as "blocks."

More specifically, each key-block can include a header to identify it as a key-block. The primary key-block can include a list of media block identifications for the one or more extension key-blocks of the key-value set. The primary key-block can include a header to a key-tree of the key-value set. The header may include a number of values to make interacting with the keys, or key-value set generally, easier. For example, the primary key-block, or header, can include a copy of a lowest key in a key-tree of the key-value set. Here, the lowest key can be determined by a preset sort-order of the tree (e.g., the total ordering of keys in the KVS tree). The primary key-block can include a copy of a highest key in a key-tree of the key-value set, the highest key determined by a pre-set sort-order of the tree. The primary key-block can further include a list of media block identifications for a key-tree of the key-value set. The primary key-block can include a bloom filter header for a bloom filter of the key-value set. In an example, the primary key-block includes a list of media block identifications for the bloom filter of the key-value set.

Each value-block can include a header to identify it as a value-block. A value-block can include a storage section to one or more values without separation between. Thus, the bits of a first value can run into bits of a second value on the storage medium without a guard, container, or other delimiter between them. The primary key-block can include a list of media block identifications for value-blocks in the set of value blocks. Thus, the primary key-block can manage storage references to value-blocks.

The primary key-block can include a set of metrics for the key-value set. In an example, the set of metrics include a total number of keys stored in the key-value set. In an example, the set of metrics include a number of keys with tombstone values stored in the key-value set. Generally, a tombstone can reside in the key entry and no value-block space will be consumed for this key-value pair. A tombstone is a data marker indicating that the value corresponding to the key has been deleted. The purpose of the tombstone is to mark the deletion of the value while avoiding the possibly expensive operation of purging the value from the KVS tree. Thus, when a tombstone is encountered using a temporally ordered search, this indicates that the corresponding value is deleted even if an expired version of the key-value pair resides at an older location within the KVS tree.

The set of metrics stored in the primary key-block can include a sum of all key lengths for keys stored in the key-value set. For example, the set of metrics can include a sum of all value lengths for keys stored in the key-value set. These last two metrics give an approximate (or exact) amount of storage consumed by the key-value set. For example, the set of metrics can include an amount of unreferenced data in value-blocks (e.g., unreferenced values) of the key-value set. This last metric gives an estimate of the space that may be reclaimed in a maintenance operation. Further details regarding the structure of KVS trees are described below.

Data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Memory sub-system controllers (e.g., that include processing devices) write to memory devices randomly in small chunks of data (e.g., 4 KB), and then use large amounts of metadata to map a logical address space to the physical address space of the memory devices. When a larger group of data (e.g., 100 MB or more) is written that has data locality, however, the "data group" can be sequentially written as a larger chunk to one or more block sets. Memory sub-systems that can write to independent zones of data at a time and map the zones accordingly can be said to operate in a zoned namespace (ZNS), e.g., where a zone of logical addresses is named/identified as a group. Advantageously, use of ZNS for logical-to-physical (LTP) address mapping can reduce the amount of metadata to track the LTP mapping.

A KVS can utilize a zoned memory device to store data. More specifically, a KVS data structure (e.g., KVS tree) can store data on zones allocated by the zoned memory device. One example of a zoned memory device is a ZNS memory device including a ZNS memory sub-system. For example, the ZNS memory sub-system can include a ZNS solid-state drive (SSD). In contrast to non-ZNS memory devices, in which the data placement is controlled by the memory-subsystem controller, in ZNS-aware memory sub-systems, a zone is write once and in sequential order of logical addresses. That is, an application cannot overwrite a logical address written to the zone. These features of ZNS memory devices can lead to reduced write amplification, reduced media over-provisioning, reduced volatile memory (e.g., DRAM) utilization, and increased drive writes.

Another example of a zoned memory device is a Shingled Magnetic Recording (SMR) storage medium. SMR is a magnetic storage data recording technique that can provide increased per-drive storage capacity compared to generic magnetic recording techniques. More specifically, SMR removes the gaps added between tracks as done by other magnetic recording techniques by writing tracks in an overlapping manner. That is, data is written sequentially to overlap data with another track, thereby resulting in a shingle-like pattern.

A zone of a zoned memory device can be designated with a state with respect to the underlying device specification (e.g., NVMe). For example, a zone that is unwritten to can be associated with the empty state. Data writes to a zone associated with the empty state, referred to as an "empty zone," can occur from the beginning of the zone. The state of the zone can be changed from the empty state to the open state (implicit and/or explicit) when the write operation is initialized. A zone associated with the open state is referred to as an "open zone." Thus, an open zone is a zone that is currently being written to. Then, after the zone is filled with data, the zone can be associated with the full state and can be referred to as a "full zone." Upon a zone reset, the zone can revert back to the empty state. The zone can be prematurely closed prior to being filled, thereby going from the open state to the closed state ("closed zone"). The closed zone can be re-opened when writing to the corresponding zone resumes, which reverts the zone back to an open zone. Thus, open zones and closed zones can collectively be referred to as non-filled zones. To write into a zone again, a full zone has to be completely erased. Accordingly, random writes and/or overwrites may not be supported by a zoned memory device.

A KVS failure can occur for a variety of reasons. Examples of reasons for the KVS failure include, but are not limited to, power failure, KVS crash, etc. After a KVS failure, one or more zones can remain in a non-filled state (e.g., one or more open zones, one or more closed zones and/or one or more active zones). However, there can be maximum number of non-filled zones supported by a zoned memory device. For example, the number of open zones can be limited by the Maximum Open Resources (MOR) for a ZNS SSD and SMR, and the number of closed zones can be limited by Maximum Active Resources (MAR) for ZNS SSD (no limit for SMR). If the non-filled zones before the failure were left in the same state when the KVS restarts, then the number of available device controller resources would be diminished by that number. Accordingly, without performing zone recovery to identify and recover non-filled zones (e.g., by resetting the non-filled zones to empty zones), a loss in write performance and efficiency (e.g., reduced write throughput and/or capacity) can result after a failure.

Aspects of the present disclosure address the above and other deficiencies by having a memory sub-system that can perform zone recovery after a key-value store (KVS) failure (e.g., power loss, KVS crash). More specifically, the recovery process can be run when the memory sub-system of the zoned memory device is brought into an operational state after a power loss, or when the KVS restarts.

The recovery process can include two steps. A first step can recover non-filled zones (e.g., open zones and closed zones) to obtain recovered zones during a zone recovery process, irrespective of the content of the non-filled zones. More specifically, a non-filled zone can be blindly reset to obtain an empty zone. The reset causes data loss in the non-filled zones, each of which includes an uncommitted block belonging to an uncommitted key-value set. Full zones are not reset during zone recovery as they are guaranteed to only include committed data. Committed data refers to data guaranteed to be available upon recovery or reboot. The non-filled zones can be identified from zone status information obtained from a memory device of the memory sub-system. More specifically, the memory device should enable persistence of the zone status information after a power loss event or other failure. The memory device can be a non-volatile memory device, or a power-protected volatile memory device. For example, the zone status information can include a list of zones that are non-filled. Thus, zone recovery can be efficiently performed by discerning full zones from non-filled zones based on zone status information. A second step recovers the key-value sets after the zone recovery. For example, if any committed blocks belonging to a uncommitted key-value set exist, those committed blocks can be freed in order to attempt to re-create and commit the key-value set after the recovery.

Advantages of the present disclosure include, but are not limited to, simple, fast and robust zone recovery after a failure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a zoned memory device recovery (ZMR) component 113. In some embodiments, the memory sub-system controller 115 includes at least a portion of the ZMR component 113. In some embodiments, the ZMR component 113 is part of the host system 110, an application, or an operating system. In other embodiments, local media controller 135 includes at least a portion of ZMR component 113 and is configured to perform the functionality described.

The ZMR component 113 can implement zoned memory device recovery after a key-value store (KVS) failure. More specifically, for a zoned memory device allocating one or more zones for data storage associated with the KVS, the ZMR component 113 can obtain zone status information related to the one or more zones, and recover the one or more zones from the failure in view of the zone status information. In some embodiments, the zone status information includes a list of zones that are non-filled (e.g., open, closed and/or active). The zone status information can be obtained from a memory device of the memory sub-system 110. The memory device of the memory sub-system 110 should enable persistence of the zone status information after a power loss event or other failure. For example, the memory device can be a non-volatile memory device (e.g., memory device 130), or a volatile memory device. (e.g., memory device 140) with power-protection.

As will be described in further detail herein, a full zone includes only committed key-value sets, and a non-filled zone includes only uncommitted key-value sets. Thus, if the given zone is determined to be non-filled (e.g., open or closed), the given zone can be reset to an empty zone during zone recovery as it will include only uncommitted key-value sets. Otherwise, the given zone is determined to be a full zone and thus would not be reset to an empty zone during the zone recovery as it will include only committed key-value sets. Accordingly, in order to recover the one or more zones, the ZMR component 113 can reset any of zones that are determined to be non-filled after the KVS failure based on the zone status information.

After recovering the one or more zones from the failure, the ZMR component 113 can recover one or more key-value sets associated with the one or more zones. Each of the one or more key-value sets can be included within a node of a KVS tree. Further details with regard to the operations of the ZMR component 113 are described below with reference to FIGS. 2-5.

Figure 2:
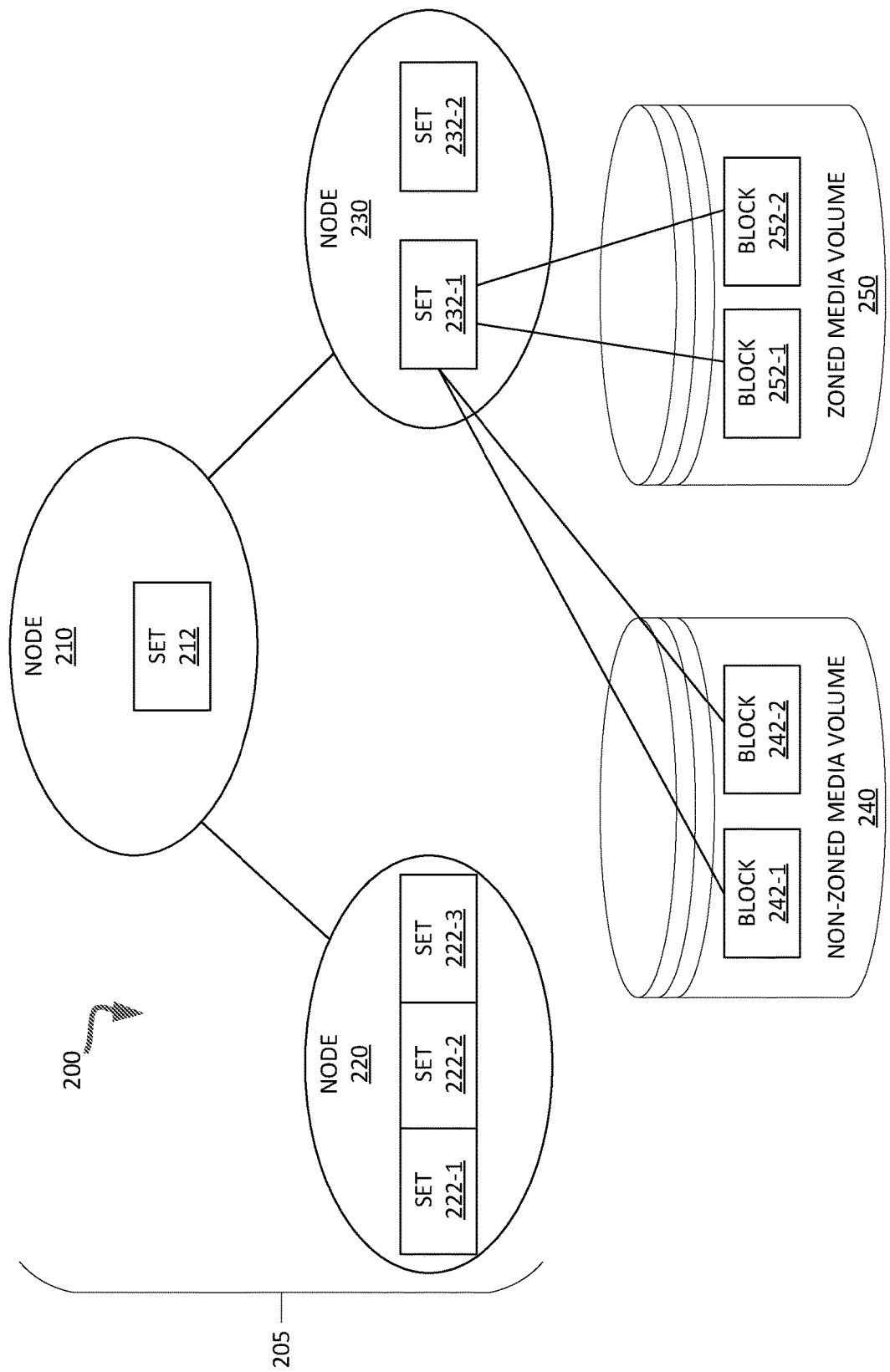
FIG. 2 is a block diagram of an example key-value store (KVS) tree in accordance with some embodiments of the present disclosure.

FIG. 2 is a block diagram of an example key-value store (KVS) tree architecture 200 in accordance with some embodiments of the present disclosure. In the illustrative example shown in FIG. 2, the architecture 200 includes a KVS tree 205 having nodes 210-230. More specifically, node 210 can be a parent node and nodes 220 and 230 can each be a child node of the node 210. In some embodiments, the node 210 is a root node of the KVS tree 205. Each of the nodes 210-230 includes at least one key-value set ("set"). For example, as shown, node 210 includes a set 212, node 220 includes sets 222-1 through 222-3, and node 230 includes sets 232-1 and 232-2.

As mentioned above, the key-value sets contain key-value pairs in a key-sorted structure. Every key in a given key-value set can be unique within the given key-value set, meaning that a given key of the given key-value set is different than each of the other keys in the given key-value set. The key-value sets are immutable, which means that the key-value set, once placed in a node, does not change. As will be described in further detail below, a key-value set may, however, be deleted, and some or all of its contents may be added to a new key-value set, etc. The immutability of the key-value set can extend to any metadata contained within the key-value set. This is generally possible because the contents to which the metadata applies are unchanging and thus, often the metadata will also be static at that point.

The KVS tree 205 can achieve the write-throughput of write buffer (WB) trees while improving upon WB tree searching by maintaining the key-value sets in the nodes. To provide efficient key-value set search, the key-value sets can include sorted keys as well as key metrics (e.g., bloom filters, minimum and maximum keys). The KVS tree 205 can improve upon the temporary storage issues of log-structured merge-trees by separating keys from values and merging smaller key-value set collections. Additionally, the KVS tree can reduce write amplification through a variety of maintenance operations on key-value sets, and hence improve memory device longevity. Further, issues such as write wear can be managed by the KVS tree 205 as the key-value sets in nodes are immutable, thereby reducing garbage collection activities of the device itself. This has the added benefit of freeing up internal device resources (e.g., bus bandwidth, processing cycles, etc.) that can result in better external drive performance (e.g., read or write speed). Moreover, the KVS tree 205 can enable tiering. More specifically, the top of the KVS tree 205 (containing the least amount of data) is updated a high frequency, while the bottom of the KVS tree 205 (containing most of the data) is updated at a low frequency. For example, the tiering can be using cheaper QLC memory cells for the bottom of the KVS tree 205 and more expensive SLC memory cells for the top of the KVS tree 205. Accordingly, the KVS tree 205 can enable the provision of overall cheaper storage that does not wear too quickly.

The architecture 200 includes non-zoned media volume 240 corresponding to a non-zoned memory device and zoned media volume 250 corresponding to a zoned memory device. Each associated with (e.g., owned by) the KVS tree 205. Each key-value set corresponds to data stored in respective blocks (e.g., key-blocks and/or value-blocks) placed on the non-zoned media volume 240 and the zoned media volume 250. As shown, the KVS tree 205 has placed blocks of key-value set 232-1 on the volumes 240 and 250. For example, the KVS tree 205 places blocks 242-1 and 242-2 on the non-zoned media volume 240 and places blocks 252-1 and 252-2 on the zoned media volume 250. Each of the blocks 252-1 and 252-2 corresponds to a respective zone on the zoned media volume 250. The blocks 242-1, 242-2, 252-1 and 252-2 can be any combination of key-blocks and/or value-blocks. Although two blocks are placed on each of the volumes 240 and 250, any suitable number of blocks can be placed on the volumes 240 and 250 in accordance with the embodiments described herein.

A block manager can manage the life cycle of a block (e.g., key-block or value-block) located on the zoned media volume 250 (e.g., block 252-1 and/or block 252-2) using a block manager persisted log. More specifically, the block manager persisted log can maintain information related to commitment of the blocks located on the zoned media volume 250 to the block manager persisted log (e.g., block commit records). In some embodiments, the block manager is implemented as part of a ZMR component (e.g., the ZMR component 113 of FIG. 1). In other embodiments, the block manager is implemented separate from the ZMR component. Further details regarding the operations performed by the block manager for managing the lifecycle of a block will now be described below with reference to FIG. 3.

Figure 3:
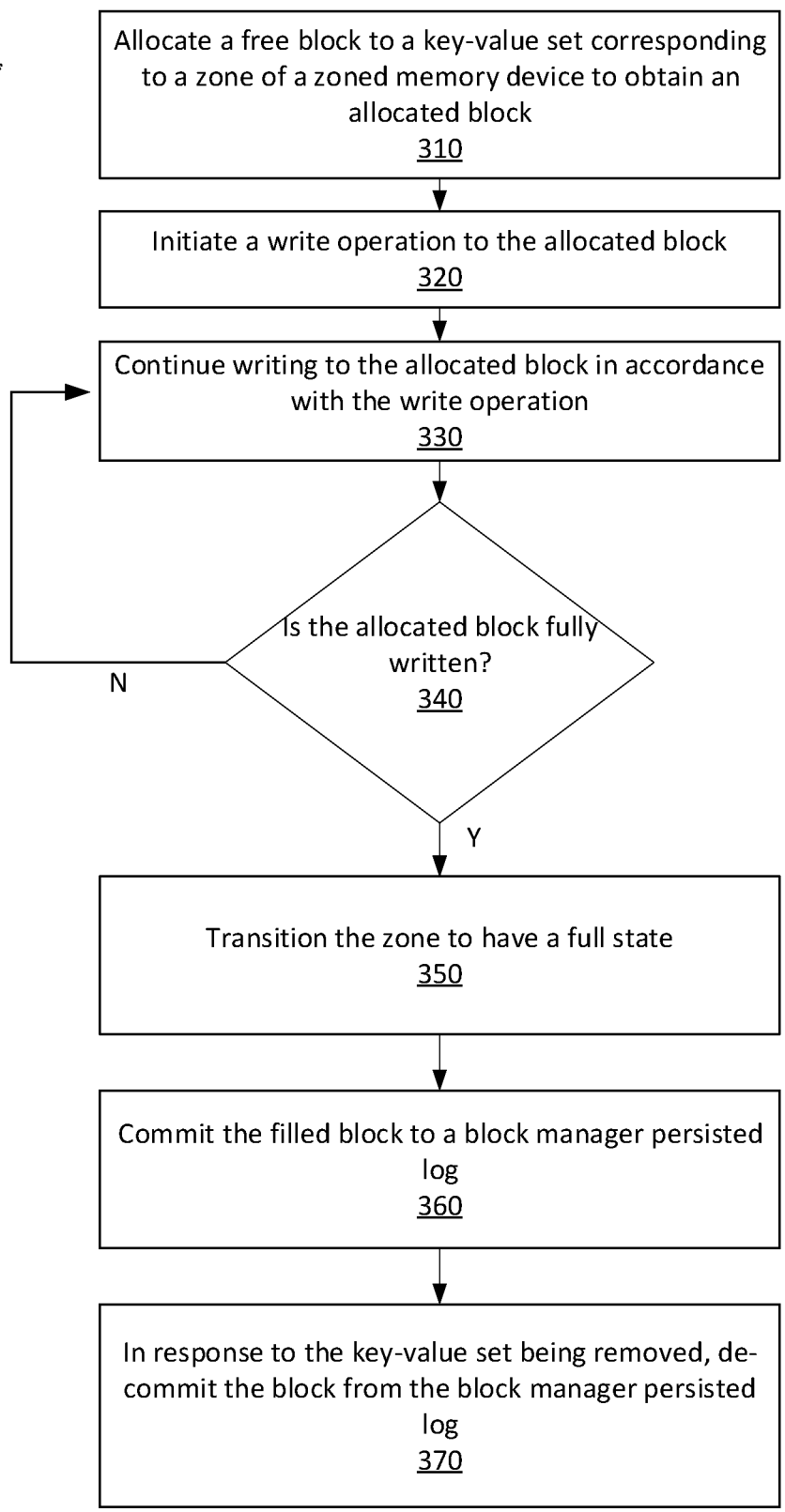
FIG. 3 is a flow diagram of an example method for managing the life cycle of a block of a key-value store (KVS) tree in accordance with some embodiments of the present disclosure.

FIG. 3 is a flow diagram of an example method 300 for managing the life cycle of a block of a key-value store (KVS) tree in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the ZMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic allocates a free block to a key-value set corresponding to a zone of a memory device to obtain an allocated block. For example, the free block can be a key block or a value block. That is, a free block is a block that is not used by any key-value set, and an allocated block is a block that has been allocated to a key-value set. In some embodiments, the zone has an empty state ("empty zone") prior to the allocation. The zone state is changed and/or maintained by the memory device (e.g., SSD). More specifically, the memory device can change the zone state as a reaction to host system actions (e.g., write, reset zone, commands). Zoned namespace or SMR specifications can be viewed to see how the host system actions impact the zone state maintained on the memory device. Thus, the zone can be reset from a previous state (e.g., non-filled or filled) prior to the allocation. In some embodiments, the allocation is performed using a non-persisted block transition. A non-persisted block transition is a block transition that is lost (e.g., after a failure). For example, the KVS tree, knowing which zones it has valid data stored on, can select a zone with no valid data (e.g., a zone of a key-value set that was destroyed), and reset the zone for allocation.

At operation 320, the processing logic initiates a write operation to the allocated block. Upon the initiation of the write operation, the zone is transitioned or updated to an open zone. For example, if the zone is empty, on the first write at the beginning of the zone, the memory sub-system changes the zone state to "open." In some embodiments, the write operation is initiated using a non-persisted block transition. For example, the write operation can be initiated when a new key-value set is created and filled up. The write operation reads data from at least one source key-value sets and writes the data into at least one destination new key-value set. When the new key-value set is committed, the source key-value set can be destroyed (and its corresponding zone can be re-used after being reset).

At operation 330, the processing logic continues writing to the allocated block in accordance with the write operation. In some embodiments, the write operation is performed using a non-persisted block transition. While the writing is progressing, the state of the zone can transition between the open state and a closed state. More specifically, this can be a result of the maximum open zone requirement of the underlying zoned namespace or SMR specification. For example, for the NVMe specification, the maximum number of open zones can be limited by the Maximum Open Resources (MOR). If it is determined that the maximum open zone requirement is exceeded, the device can automatically close one or more of the zones to address the issue. The maximum open zone requirement can be exceeded when the host system writes in too many zones (e.g., in parallel). When a zone is closed by the memory device, writes to the zone are suspended. The closed zone(s) can eventually be re-opened to take additional writes. More specifically, the write suspension is lifted such that writes targeted to the re-opened zone flow again. These actions are transparent to the host system, where the memory device performs these operations "undercover" with respect to the host system.

At operation 340, the processing logic determines if the allocated block is fully written. If not, the process reverts back to operation 330 to continue writing to the allocated block. If the allocated block is fully written, the processing logic transitions the zone to have a full state at operation 350. The zone may or may not have been fully written after the allocated block is filled. If the zone has been fully written, then the state of the zone is automatically changed to full at operation 350. However, if the zone has not been fully written (the size of data in the block is less than the size of the zone), the host system can send a zone finish command to finish the zone and, upon receipt of the zone finish command, the processing logic can transition the zone to have a full state at operation 350. Accordingly, the non-filled (e.g., open or closed zone) becomes a full zone after the allocated block is fully written.

At operation 360, the processing logic commits the filled block to a block manager persisted log. More specifically, a block commit record corresponding to the block can be added to the block manager persisted log. In some embodiments, the commitment is performed using a persisted block transition. Accordingly, the block is committed to the block manager persisted log after the zone is in a full state.

At operation 370, the processing logic, in response to the key-value set being removed (e.g., destroyed), de-commits the block from the block manager persisted log. More specifically, a block commit delete record can be added to the block manager persisted log. This de-commitment transitions the block to a free block that can be allocated. The zone can be updated to have an empty state as well by being reset. In some embodiments, the committed block is removed using a persisted block transition.

Referring back to FIG. 2, a key-value set manager can manage the lifecycle of a key-value set associated with the zoned media volume 250 (e.g., key-value set 232-1) using a KVS tree persisted log. More specifically, the KVS tree persisted log can maintain information related to key-value set creation intent after a key-value set is fully written (e.g., key-value set creation intent record), and can maintain information related to commitment of the key-value set to the KVS tree persisted log (e.g., key-value set commitment record). In some embodiments, the key-value set manager is implemented as part of a ZMR component (e.g., the ZMR component 113 of FIG. 1). In other embodiments, the block manager is implemented separate from the ZMR component. Further details regarding the operations performed by the key-value set manager for managing the lifecycle of a key-value set will now be described below with reference to FIG. 4.

Figure 4:
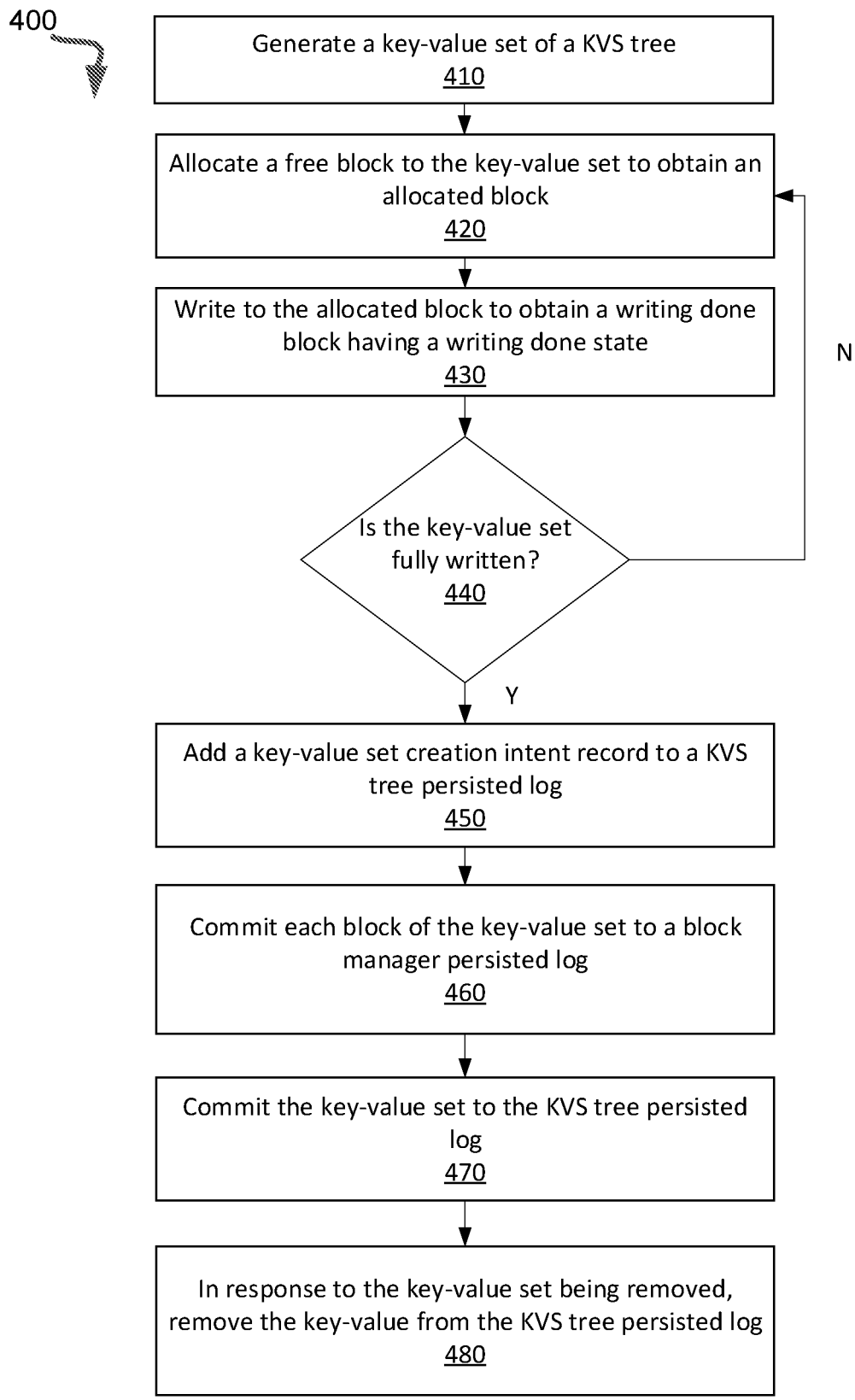
FIG. 4 is a flow diagram of an example method for managing the life cycle of a key-value set of a key-value store (KVS) tree in accordance with some embodiments of the present disclosure.

FIG. 4 is a flow diagram of an example method 400 for managing the life cycle of a key-value set (key-value set) of a key-value store (KVS) tree in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the ZMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic generates a key-value set of a KVS tree. The key-value set can be initialized with a building state. The generation of the key-value set need not be recorded in any log. In some embodiments, the key-value set generation is performed using a non-persisted KVS transition.

At operation 420, the processing logic allocates a free block having a free state to the key-value set to obtain an allocated block having an allocated state. More specifically, as described above with reference to FIG. 3, the free block corresponds to a zone of a zoned memory device. In some embodiments, the free block allocation is performed using a non-persisted KVS transition.

At operation 430, the processing logic writes to the allocated block to obtain a writing done block having a writing done state. More specifically, as described above with reference to FIG. 3, the block can be written to until it is in a writing done state and corresponding zone has a full state.

At operation 440, the processing logic determines if the key-value set is fully written after the writing done block is obtained. If the key-value set is not fully written, the process reverts back to operation 420 to allocate another free block to the key-value set for writing.

However, if the key-value set is fully written, at operation 450, the processing logic adds a key-value set creation intent record to a KVS tree persisted log. The state of the key-value set can be changed from the building state to a "key-value set creation intent logged" state. In some embodiments, the key-value set creation intent record is added to the KVS tree persisted log using a persisted KVS transition.

At operation 460, the processing logic commits each block of the key-value set to a block manager persisted log. More specifically, as described above with reference to FIG. 3, a block commit record corresponding to the block can be added to the block manager persisted log. In some embodiments, each block of the key-value set is committed using a persisted KVS transition.

At operation 470, the processing logic commits the key-value set to the KVS tree persisted log. More specifically, a key-value set commit record corresponding to the key-value set can be added to the KVS tree persisted log. In some embodiments, the key-value set is committed to the KVS tree persisted log using a persisted KVS transition.

At operation 480, in response to the key-value set being removed (e.g., destroyed), the processing logic removes the key-value set from the KVS tree persisted log. More specifically, a key-value set delete record can be added to the KVS tree persisted log. In some embodiments, the key-value set is removed using a persisted KVS transition.

Referring back to FIG. 2, in view of the block lifecycle management process described above with reference to FIG. 3 and key-value set lifecycle management process described above with reference to FIG. 4, a given zone of the zoned media volume 250 cannot include both uncommitted blocks and committed blocks. In turn, as will be described in further detail below with reference to FIG. 5, a recovery process with respect to the zones of the zoned media volume 250 can be performed after a KVS failure by identifying one or more non-filled zones in view of zone status information, and recovering the one or more non-filled zones (since non-filled zones will be the only zones to include uncommitted blocks). The zone status information can be maintained by the memory device in non-volatile memory or power-protected volatile memory (e.g., in a list including non-filled zones). After the zone recovery, the corresponding key-value sets can be recovered.

Figure 5:
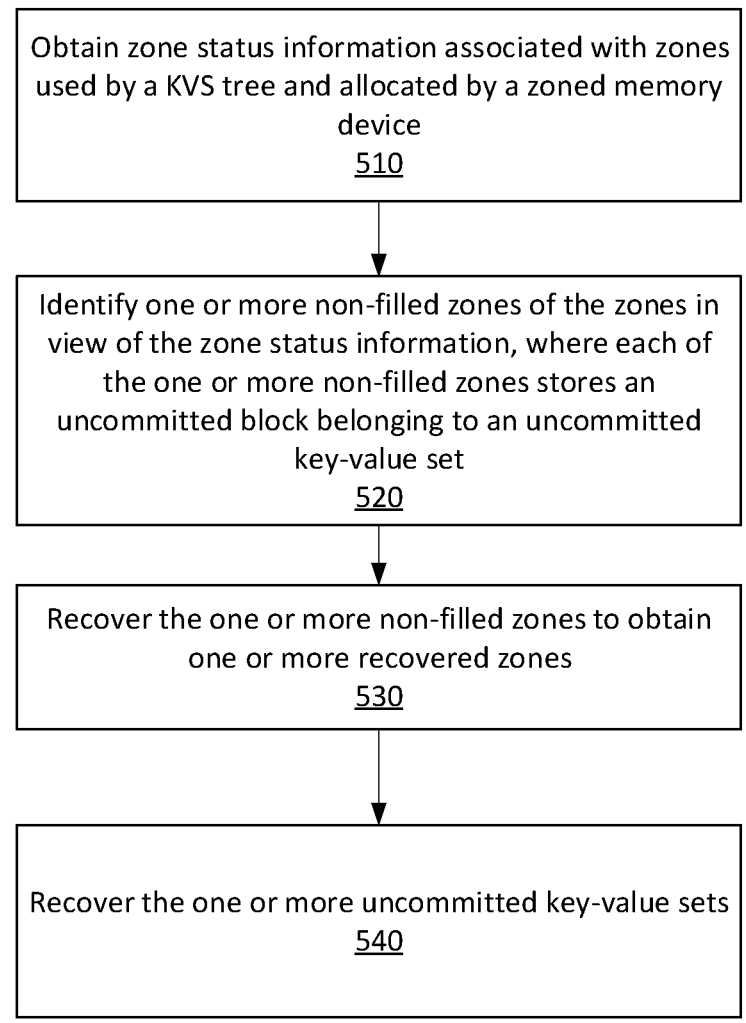
FIG. 5 is a flow diagram of an example method to implement zoned memory device recovery after a key-value store (KVS) failure in accordance with some embodiments of the present disclosure.

FIG. 5 is a flow diagram of an example method 500 to implement zoned memory device recovery after a key-value store (KVS) failure in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the ZMR component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic obtains zone status information associated with zones used by a KVS tree and allocated by a zoned memory device. More specifically, each of the zones can store a block of a key-value set of the KVS tree. For example, the block can be a key-block or a value-block. The zone status information can be obtained from the entity owning the zones (e.g., the memory device or volume manager). For example, the zone status information can include a list of the states of the one or more zones used by the KVS tree (e.g., full, open, closed, empty). No knowledge of the KVS is required to obtain the zone status information. Rather, the zone status information can be obtained using the identity of the zoned device namespace, zoned volume, etc. used by the KVS. In some embodiments, the zoned memory device includes a ZNS memory sub-system (e.g., a ZNS SSD). In some embodiments, the zoned memory device includes a SMR device.

At operation 520, the processing logic identifies one or more non-filled zones of the zones in view of the zone status information, where each of the one or more non-filled zones stores an uncommitted block belonging to an uncommitted key-value set. The key-value set is uncommitted since an uncommitted block belonging to it exists. For example, the one or more non-filled zones can include at least one open zone, at least one closed zone and/or at least one active zone. If no KVS failure occurred, no zone would be found in a non-filled state. Therefore, if one or more non-filled zones are identified, a failure had occurred.

At operation 530, the processing logic recovers the one or more non-filled zones to obtain one or more recovered zones. More specifically, recovering the one or more non-filled zones can include resetting the one or more non-filled zones. The one or more recovered zones can include one or more empty zones open for new data writes.

At operation 540, the processing logic recovers the one or more uncommitted key-value sets. The one or more uncommitted blocks belonging to the one or more uncommitted key-value sets are lost during the recovery of the one or more non-filled zones. However, there may be one or more committed blocks belonging to a given key-value set of the one or more key-value sets, in which the one or more committed blocks are stored on filled zones that were not reset during the recovery. This situation can happen if the failure happened after some blocks belonging to the given key-value set had been committed but the given key-value set itself was still uncommitted before the failure. Thus, recovering the one or more uncommitted key-value sets can include freeing any committed block(s) belonging to the one or more key-value set. "Freeing" refers to making the logical address space previously used by the committed blocks available for new blocks. Therefore, an attempt can be made to create one or more new key-value sets to be committed after the recovery.

Figure 6:
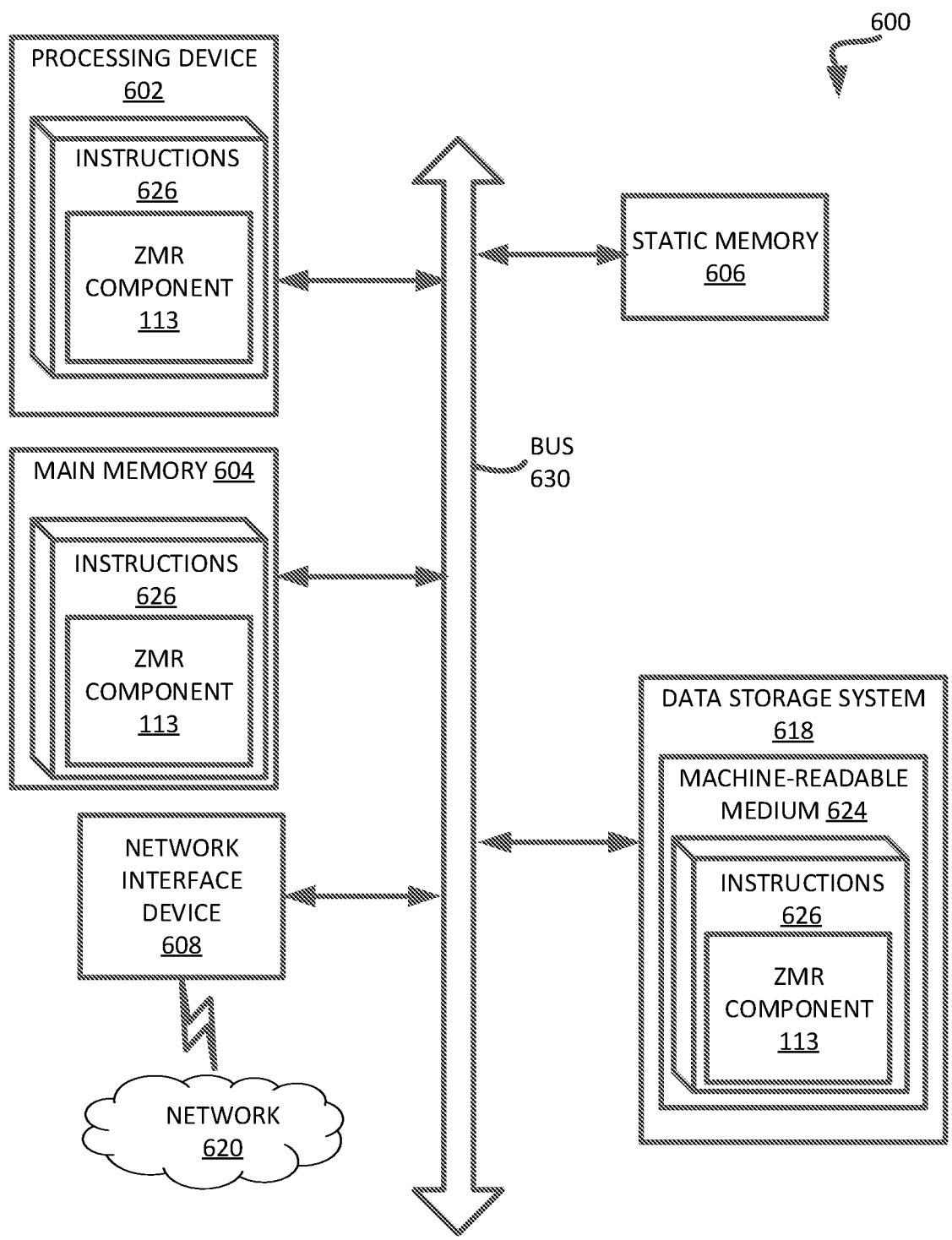
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the ZMR component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a ZMR component (e.g., the ZMR component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a zoned memory device allocating a zone; and
a processing device, operatively coupled with the zoned memory device, to perform operations comprising:
obtaining zone status information associated with the zone;
determining, in view of the zone status information, whether the zone is a non-filled zone storing at least one uncommitted block belonging to an uncommitted key-value set, wherein the at least one uncommitted block comprises at least one of: an uncommitted key block or an uncommitted value block; and in response to determining that the zone is a non-filled zone, recovering the non-filled zone to obtain a recovered zone.

2. The system of claim 1, wherein the key-value set is associated with a key-value store tree.

3. The system of claim 1, wherein the zone status information comprises a list of states of a plurality of zones allocated by the zoned memory device.

4. The system of claim 1, wherein recovering the non-filled zone comprises resetting the non-filled zone.

5. The system of claim 1, wherein the recovered zone is an empty zone.

6. The system of claim 1, wherein the operations further comprise recovering the uncommitted key-value set.

7. The system of claim 6, wherein recovering the uncommitted key-value set comprises freeing a committed block belonging to the uncommitted key-value set.

8. A method comprising:
obtaining, by a processing device, zone status information associated with a zone allocated by a zoned memory device, wherein the zone stores a block belong to a key-value set;
determining, by the processing device in view of the zone status information, whether the zone is a non-filled zone storing at least one uncommitted block belonging to an uncommitted key-value set, wherein the at least one uncommitted block comprises at least one of: an uncommitted key block or an uncommitted value block; and
in response to determining that the zone is a non-filled zone, recovering, by the processing device, the non-filled zone to obtain a recovered zone.

9. The method of claim 8, wherein the key-value set is associated with a key-value store tree.

10. The method of claim 8, wherein the zone status information comprises a list of states of a plurality of zones allocated by the zoned memory device.

11. The method of claim 8, wherein recovering the non-filled zone comprises resetting the non-filled zone.

12. The method of claim 8, wherein the recovered zone is an empty zone.

13. The method of claim 8, further comprising recovering, by the processing device, the uncommitted key-value set.

14. The method of claim 13, wherein recovering the uncommitted key-value set comprises freeing a committed block belonging to the uncommitted key-value set.

15. A non-transitory computer-readable storage medium comprising instructions that, when executed by a processing device, cause the processing device to perform operations comprising:
obtaining, by a processing device, zone status information associated with a plurality of zones allocated by a zoned memory device, wherein each zone of the plurality of zones stores at least one block belonging to a respective key-value set associated with a key-value store tree, wherein the at least one block comprises at least one of: a key-block or a value-block;
identifying, by the processing device, a non-filled zone of the plurality of zones in view of the zone status information, wherein the zone status information indicates that the at least one block stored by the non-filled zone comprises at least one uncommitted block to and the respective key-value set is an uncommitted key-value set; and
resetting, by the processing device, the non-filled zone to obtain an empty zone.

16. The non-transitory computer-readable storage medium of claim 15, wherein the zone status information comprises a list of states of a plurality of zones allocated by the zoned memory device.

17. The non-transitory computer-readable storage medium of claim 15, wherein the operations further comprise recovering the uncommitted key-value set.

18. The non-transitory computer-readable storage medium of claim 17, wherein recovering the uncommitted key-value set comprises freeing a committed block belonging to the uncommitted key-value set.

* * * * *